United States Patent

[11] 3,631,808

| | | |
|---|---|---|
| [72] | Inventor | Gaston Moyse<br>La Courneuve, France |
| [21] | Appl. No. | 787,006 |
| [22] | Filed | Dec. 26, 1968 |
| [45] | Patented | Jan. 4, 1972 |
| [73] | Assignee | Moyse S. A.<br>La Courneuve, France |
| [32] | Priority | Jan. 9, 1968 |
| [33] | | France |
| [31] | | 135266 |

[54] LINEAR MOTOR POWERED RAILWAY
3 Claims, 3 Drawing Figs.

[52] U.S. Cl. .................................................. 104/148
LM, 104/135, 104/243, 105/49, 105/145,
105/181, 238/2, 238/107, 238/382, 295/1,
318/135
[51] Int. Cl. ............................................... B60l 13/00,
B61b 13/00, B61c 9/38
[50] Field of Search ............................................ 104/78, 148
LM, 135, 243; 105/1, 29, 144, 49, 145, 215, 181;
318/135; 238/382; 188/218; 295/1, 8.5

[56] References Cited
UNITED STATES PATENTS

| 546,609 | 9/1895 | Dearing .......................... | 188/218 |
|---|---|---|---|
| 557,960 | 4/1896 | Brintnell ......................... | 104/148 LM |
| 955,382 | 4/1910 | Clark ................................ | 104/243 |
| 2,135,307 | 11/1938 | Keator ............................. | 295/8.5 |
| 35,244 | 5/1862 | McNair ........................... | 105/215 |
| 485,286 | 11/1892 | Loyd ............................... | 105/215 |
| 573,823 | 12/1896 | Leffler ............................. | 104/148 |
| 901,435 | 10/1908 | Fuller .............................. | 104/78 |
| 927,830 | 7/1909 | Clark ............................... | 105/1 X |
| 961,532 | 6/1910 | Reinehr ........................... | 105/144 |
| 1,298,952 | 4/1919 | James .............................. | 105/215 |
| 2,412,512 | 12/1946 | Jones et al. ..................... | 318/135 |
| 2,652,785 | 9/1953 | Cox ................................. | 105/29 |
| 3,198,139 | 8/1965 | Dark ............................... | 105/145 |
| 3,233,559 | 2/1966 | Smith et al. .................... | 105/1 |
| 2,686,009 | 8/1954 | Crowe ............................. | 238/382 X |

FOREIGN PATENTS

| 1,528,846 | 5/1968 | France ............................ | 104/148 LM |

*Primary Examiner*—Arthur L. La Point
*Assistant Examiner*—Howard Beltran
*Attorney*—Stevens, Davis, Miller & Mosher ABSTRACT: An improvement in fixed flat-inductor linear induction motors for propelling railway vehicles or like movable bodies along an established route comprising an armature fixedly mounted on said vehicle and a flat inductor extending along the route and rigid with support means. Runway means and carrier wheel means are mounted between the support means and the vehicle. The carrier wheels are mounted on a common axle and include, on each side of the vehicle, a main wheel and an auxiliary roller rotatably rigid with each other. The auxiliary rollers are mounted in the vicinity of the motor armature and coact with an additional runway to compensate, when rolling, for the magnetic attraction exerted by the inductor on the armature.

PATENTED JAN 4 1972 3,631,808

INVENTOR
GASTON MOYSE
By Stevens, Davis, Miller & Mosher
ATTORNEYS

LINEAR MOTOR POWERED RAILWAY

The present invention relates to linear motors of the fixed-inductor flat type, notably for railway and other vehicles.

It is known that contrary to what is observed in a keel-type linear motor, single-face or flat linear motor requires a magnetic armature and therefore sets up considerable magnetic attraction forces between the inductor and armature. As a rule these forces are counteracted by using rolling holding apparatus capable of constantly preserving a regular gap without appreciably altering the effective propelling power.

Fixed-inductor flat linear motors designed for propelling railway vehicles are already known; wherein it is endeavored to maintain a regular magnetic gap by using to this end the wheels permitting the rolling of the vehicle on rails. However, experience teaches that the rolling precision on the one hand and the flexibility of the structures involved on the other hand prevented this on the onset attractive dual function.

It is the object of this invention to provide a novel arrangement of the rolling wheels of the vehicle with a view to enable them to perform in a very satisfactory and economical manner, by coacting with certain component elements of the linear motor itself, the above-defined function consisting in maintaining a regular magnetic gap.

This improvement in fixed-inductor flat linear motors as applied to railway vehicles or other movable bodies comprising an armature-forming frame structure, and wherein the magnetic attraction exerted by the inductor on the armature is compensated by the rolling of the vehicle-supporting wheels, is characterized in that the configuration of the carrier wheels of the vehicle is such that permit the rolling thereof without causing any appreciable distortion of the vehicle armature, by coacting with runways or races and also with support means rigid with the fixed field magnet.

Other features of this invention will appear as the following description proceeds with reference to the accompanying drawing illustrating diagrammatically by way of example two forms of embodiment of a linear motor constructed according to the teachings of this invention, and wherein.

Figure 1:
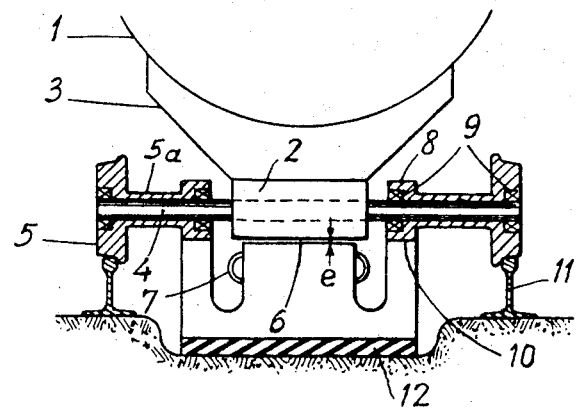
FIG. 1 is a part-sectional view of an arrangement wherein a railway vehicle propelled by a linear motor is adapted to roll on rails.

Referring first to fig. 1, there is shown diagrammatically therein the front portion of a railway vehicle, in this example a tip-truck, propelled by a linear motor of the fixed-inductor flat type. The loading apron 1 is secured to the frame structure 2 by means of stays or brackets 3. The vehicle rolls on wheels 5 mounted on an axle 4.

According to the provisions of the applicant's French Pat. No. 1,528,846 the frame structure 2 also acts as an armature of the linear motor of which the inductor or field magnet 6 comprises windings shown diagrammatically at 7. The magnetic gap $e$ must constantly be maintained at a precise value as explained in the forgoing. Since relatively considerable magnetic attraction forces develop between the inductor 6 and armature 2, the reaction forces must necessarily be exerted in the vicinity of said attraction forces in order to reduce the bending moments and the correlative structural distortions.

This condition is met according to the present invention by providing auxiliary wheels or rollers 8 which, being rotatably rigid with the main wheels 5 through a tubular coupling 5a, utilize the same rolling-contact bearings 9 and roll on runways or races 10 rigid with, and adjacent to, the inductor 6.

In order to have the reaction efforts resulting from the above-described magnetic attraction supported by the rolling engagement of rollers 8 on runways 10, two cases may be contemplated:

1. The motor inductor is rigidly secured to the rails and sleepers, and in this case, due to the rolling engagement with the runways 10, of the vehicle carrier wheels 5 must tend to rise above the rails 11. It should be noted that as the magnetic attraction forces are usually much greater than the weight of the movable body or vehicle, the overload thus supported by the auxiliary wheels or rollers 8 can be disregarded.

2. The inductor or field magnet 6 of the linear motor may be secured to the ballast or track bottom by means of a resilient intermediate layer or member 12. In this case, regardless of the degree of wear of the main or carrier wheels 5 of the tip-truck on rails 11, the linear motor cannot exert an appreciable vertical stress on the truck since it cannot react to this end against a sufficiently rigid body or member.

This second solution illustrated in FIG. 1 constitutes the preferred form of embodiment of the invention. Since, when the tip-truck or like vehicle clears the linear inductor of two types of wheels rotatable rigid with each other engage their runways simultaneously, it is well that the diameters of these wheels differs only moderately in order to reduce relative frictional contacts on the runways which would lead to premature wear and to a loss of power.

The mode of operation of the composite wheel system according to this invention will appear clearly from a detailed description or analysis of the passage of the tip-truck on the linear motor in the case (2) mentioned hereinabove.

When the tip-truck frame structure constituting the motor armature register with the inductor 6 energized through suitable conductors (not shown), this inductor has a dual action. On the one hand, the magnetic field created between it and the registering armature develops a vertical attraction or pull according to the known laws of electromagnetism. This action is relatively powerful and compensated by the rolling of the auxiliary wheels or rollers 8 rotatably rigid with the armature 2 on the runways 10 rigid with the inductor 6. It is the proximity of the roller 8 with respect to the armature body 2 that causes the axle 4 to transmit without any appreciable distortion the electromagnetic force to the compensation bearing.

On the other hand, the motor exerts a horizontal effort on the armature 2 which corresponds to the useful or efficient propulsion of the tip-truck, and the motor is adjusted, set or wedged laterally for transmitting this effort. It should be noted that when the rollers 8 engage the runways 10 rigid with the inductor 6 they must have the possibility of slightly compressing the resilient layer 12 underlying the inductor which is free in the vertical direction, at the cost of a very moderate effort. This arrangement permits a concurrent action of the wheels 5 and rails 11, and also of rollers 8 and runways 10. This arrangement further permits with a very close approximation the compensation of the electromagnetic attraction efforts only by this rolling engagement of rollers 8 on runways 10.

All the usual cares are taken to prevent the runways from forming a magnetic shunt with the linear motor.

In case the motor is supported directly by means connected to the sleepers or to the ballast of the track, it is useful, as already explained hereinabove, that the contact between the rollers 8 and the runways 10 causes the tip-truck to be lifted with respect to the main rails 11, in order to avoid the risk of compensating the magnetic pull by means of the rails themselves. This occurrence would lead to a distortion of the axle and frame structure. Another consequence of such an arrangement is that as the rolling engagement between the wheels 5 and rails 11, on the one hand, and between the rollers 8 and runways 10, on the other hand, is not simultaneous, it is not necessary that the radii of the wheels and rollers be nearly equivalent. This in certain cases may constitute an appreciable advantage.

Regarding the construction of movable bodies or vehicles for railway purposes according to this invention, it does not require any novel means not in current and conventional use in railway technique and industry.

As to the manner of developing an assembly of the type illustrated diagrammatically in FIG. 1, it is obvious that the availability of various shims or like setting or wedging means for adjusting the relative vertical heights or level of the motor and rails for example will greatly facilitate this development, but this calls only for current mechanical and engineering skill and knowledge.

Figure 2:
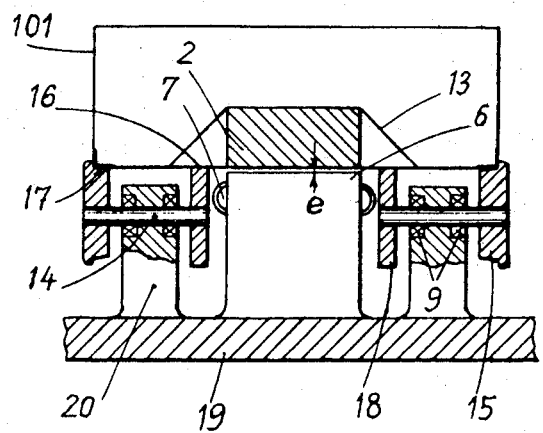
FIG. 2 illustrates another arrangement of a movable unit of a conveyor propelled by a linear motor and adapted to roll on wheels having their support means rigid with the inductor or field magnet.

It goes without saying that this invention is also applicable to a conveyor wherein the wheels are carried by the fixed supporting structure of the assembly, this conveyor being propelled by a fixed-inductor flat linear motor. Referring to FIG. 2 it will be seen that in this arrangement the containers 101 constituting the movable body comprise the armature 2 of the linear motor with its suspension means 13. In this case the rotary shafts 14 carry the wheels 15 on which the movable bodies of containers 101 are adapted to roll. These shafts are mounted in bearings 9 and support as in the preceding example companion rollers 18 for compensating the magnetic attraction effort between the armature 2 and inductor 6, and maintaining the magnetic gap $e$. According to a characteristic feature of this invention, these rollers 18 are disposed in close vicinity of the armature 2 in order to minimize the risks of distortion of the structure of said containers 101. These containers or movable bodies 101 are provided with runways or races 16 registering with the rollers 18 and elements 17 replacing the rails of the railway structure proper which register with the main wheels 15. Both the runways or races 16 and elements 17 are sufficiently hard and flat. On the other hand, in this arrangement uprights or like members 20 rigid with the fixed support 19 receive the bearing means 9 of shafts 14. The inductor 6, also rigid with said fixed support 19, could also play the same role at the cost of a single axle extending through it and supporting one either side of the composite wheel systems of this invention.

In the case illustrated in FIG. 2, the wheels 15 and rollers 18 could be interconnected by a tubular shaft journaled in the supports 10 and thus constitute a composite assembly like the one shown in FIG. 1.

Figure 3:
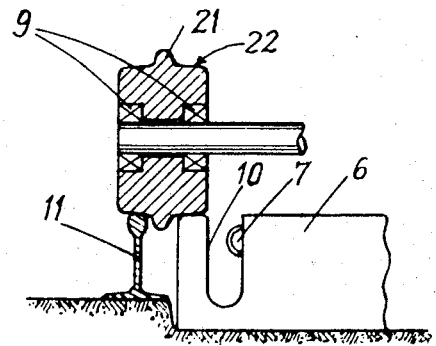
FIG. 3 is a detail view showing a modified construction of one portion of the arrangement of FIG. 1 in the case of closely spaced main and auxiliary wheels.

Finally, it should be noted that in the case shown in FIG. 1 the main wheels 5 and secondary or auxiliary wheels or rollers 8 may be disposed very close to each other, for instance for reasons of overall dimensions, and that a single central flange 21 will guide the two treads 22 of FIG. 3 showing for the sake of simplification the runway 10, rails 11, inductor 6, 7 and bearings 9.

I claim:

1. A fixed flat-inductor linear motor for propelling vehicles along an established path comprising an armature fixedly mounted on said vehicle, fixedly mounted horizontal inductor extending along said path, carrier wheel means on each side of said vehicle, each said carrier wheel means comprising a main flanged wheel and a separate auxiliary roller connected to said main flanged wheel by an axle but spaced from said main wheel to be adjacent said inductor, and runway means comprising main rails coacting with said main wheels and separate flat runways parallel to said main rails and adjacent to said inductor, said runways coacting with said auxiliary rollers to additionally support said vehicle and thereby maintain the gap between the armature and inductor against the magnetic attraction exerted by said inductor on said armature.

2. A linear motor according to claim 1, further comprising a plurality of support means rigid with said inductor, located on both sides thereof, extending the length of said path, and having carrier wheel means rotatably mounted thereon; each said support having on its upper end a set of bearings and said axle journaled in said set of bearings, said main wheel of said carrier wheel means being fixed to an outer end of said shaft and said auxiliary roller being fixed to the inner end of said shaft adjacent to said inductor; said main rails comprising an angle iron rigid with a bottom outer edge of said vehicle and coacting with said flanged main wheels, said flat runway being fixed to the bottom of said vehicle and coating with said auxiliary rollers.

3. A linear motor according to claim 2, wherein said supports on each side of the inductor are brackets rigid with a fixed support of said inductor.

* * * * *